(12) United States Patent
Hayashi et al.

(10) Patent No.: US 7,955,998 B2
(45) Date of Patent: *Jun. 7, 2011

(54) OPTICAL GLASS, PRECISION PRESS-MOLDING AND PROCESS FOR THE PRODUCTION THEREOF, AND OPTICAL ELEMENT AND PROCESS FOR THE PRODUCTION THEREOF

(75) Inventors: Kazutaka Hayashi, Yokohama (JP); Yasuhiro Fujiwara, Akishima (JP)

(73) Assignee: Hoya Corporation, Tokyo (JP)

( * ) Notice: Subject to any disclaimer, the term of this patent is extended or adjusted under 35 U.S.C. 154(b) by 595 days.

This patent is subject to a terminal disclaimer.

(21) Appl. No.: 11/717,178

(22) Filed: Mar. 13, 2007

(65) Prior Publication Data

US 2007/0225148 A1 Sep. 27, 2007

(30) Foreign Application Priority Data

Mar. 23, 2006 (JP) .................................. 2006-081484
Dec. 19, 2006 (JP) .................................. 2006-340778

(51) Int. Cl.
C03C 3/155 (2006.01)
C03C 3/15 (2006.01)
C03C 3/066 (2006.01)

(52) U.S. Cl. ............................. 501/51; 501/50; 501/79

(58) Field of Classification Search .................. 501/50, 501/51, 79
See application file for complete search history.

(56) References Cited

U.S. PATENT DOCUMENTS

| 6,797,659 | B2 * | 9/2004 | Uehara ............................ 501/78 |
| 6,844,279 | B2 * | 1/2005 | Hayashi et al. ................ 501/50 |
| 6,977,232 | B2 * | 12/2005 | Hayashi et al. ................ 501/79 |
| 2003/0022782 | A1 | 1/2003 | Uehara |
| 2003/0100433 | A1 * | 5/2003 | Hayashi et al. ................ 501/79 |
| 2003/0125186 | A1 * | 7/2003 | Hayashi et al. ................ 501/50 |
| 2004/0186003 | A1 * | 9/2004 | Uehara ............................ 501/78 |
| 2004/0235638 | A1 * | 11/2004 | Uehara et al. .................. 501/78 |
| 2005/0049135 | A1 * | 3/2005 | Hayashi ........................... 501/78 |
| 2005/0113240 | A1 * | 5/2005 | Hayashi et al. ................ 501/50 |
| 2005/0223743 | A1 | 10/2005 | Hayashi |
| 2006/0079389 | A1 * | 4/2006 | Hayashi .......................... 501/50 |
| 2009/0062101 | A1 | 3/2009 | Uehara |

FOREIGN PATENT DOCUMENTS

| JP | 06-305769 | 11/1994 |
| JP | 08-217484 | 8/1996 |
| JP | 2002-362938 | 12/2002 |
| JP | 2003-201142 | 7/2003 |
| JP | 2002-12443 | 1/2005 |
| JP | 2005-272253 | 10/2005 |
| JP | 2005-298262 | 10/2005 |
| JP | 2005-330154 | 12/2005 |
| JP | 2006-240889 | 9/2006 |
| WO | WO 2006093062 A1 * | 9/2006 |

OTHER PUBLICATIONS

Machine Translation of JP 2002-012443, Jan. 15, 2002.*

* cited by examiner

*Primary Examiner* — Karl E Group
*Assistant Examiner* — Elizabeth A Bolden
(74) *Attorney, Agent, or Firm* — Nixon & Vanderhye P.C.

(57) ABSTRACT

A high-refractivity optical glass which has both a low-temperature softening property suitable for precision press-molding and glass stability suitable for hot-shaping of a preform, which contains, by mass %, 13 to 30% of $B_2O_3$, 0.1 to 4% of $Li_2O$, 17 to 35% of ZnO, 15 to 45% of $La_2O_3$, 4 to 15% of $Ta_2O_5$ exclusive of 15%, 0 to 10% of $ZrO_2$, 0 to 10% of $Nb_2O_5$ provided that $Ta_2O_5/(Ta_2O_5+ZrO_2+Nb_2O_5)>0.3$, 0 to 20% of $WO_3$ and 0 to 1% of $Sb_2O_3$ and which has a refractive index $(n_d)$ of 1.80 to 1.84 and an Abbe's number $(v_d)$ of 40.0 to 45.0.

12 Claims, 1 Drawing Sheet

OPTICAL GLASS, PRECISION PRESS-MOLDING AND PROCESS FOR THE PRODUCTION THEREOF, AND OPTICAL ELEMENT AND PROCESS FOR THE PRODUCTION THEREOF

TECHNICAL FIELD

The present invention relates to a high-refractivity optical glass having a low-temperature-softening property suitable for precision press-molding, a precision press-molding preform formed of the optical glass, a process for the production of the preform, an optical element formed of the optical glass and a process for the production of the optical element.

TECHNICAL BACKGROUND

A high-performance and compact image-sensing unit or camera such as a digital camera has an aspherical lens made of a high-refractivity glass. Such lenses are mass-produced by press-molding a glass material called a preform with a press mold having precision-worked molding surfaces to precisely transferring forms of the above molding surfaces to the glass material.

The above press-molding is called precision press-molding and capable of forming an optical-function surface of an optical element by press-molding, so that it enables the mass production of aspherical lenses at a low cost and with high productivity as compared with a process of completing aspherical lenses by grinding and polishing glass to lenses one after another.

There have been proposed precision press-molding glasses having various optical properties. Specifically, JP-A-6-305769 and JP-A-8-217484 proposes such glasses.

PROBLEMS TO BE SOLVED BY THE INVENTION

The advantage of the precision press-molding is that optical elements of which the production by grinding and polishing is costly and time-consuming can be highly productively mass-produced. When preforms can be produced directly from a molten glass, the process starting with the melting of glass and ending with the production of optical elements can be made more efficient.

In the above process a molten glass gob having an amount equivalent to one preform is obtained and the glass gob is shaped into a preform during the cooling of the molten glass gob (to be referred to as "hot-shaping" hereinafter), so that the above process is highly productive as compared with the process of cutting, grinding and polishing a glass to complete a preform and that it has an advantage that glass dust called sludge involved in the cutting, grinding and polishing does not occur, and the molten glass can be used without involving wasteful dust. When an expensive glass material is used, therefore, the cost does not much increase, and highly functional glass materials may be used.

For hot-shaping a preform, however, it is required to shape a molten glass gob into a preform without causing any slight defects such as striae and devitrification. In particular, when a high-refractivity glass is shaped into a preform, the temperature for the outflow of a molten glass is increased for preventing devitrification. In this case, the viscosity of the glass decreases, which may lead to a difficulty in the shaping, or intense volatilization occurs from the glass surface having a high temperature, which may lead to the occurrence striae. On the other hand, when the temperature for the outflow is decreased, a glass comes to devitrify. For the stable production of quality preforms, therefore, there is required a material having excellent glass stability in a high-temperature range.

It is an object of the present invention to provide a high-refractivity optical glass having both the low-temperature softening property suitable for precision press-molding and excellent glass stability suitable for the hot-shaping of preforms, a precision press-molding preform formed of the above optical glass and a process for the production thereof, and an optical element formed of the above glass and a process for the production thereof.

MEANS TO SOLVE THE PROBLEMS

The present invention has been made for overcoming the above problems and provides;

(1) an optical glass comprising, by mass %, 13 to 30% of $B_2O_3$, 0.1 to 4% of $Li_2O$, 17 to 35% of ZnO, 15 to 45% of $La_2O_3$, 4 to 15% of $Ta_2O_5$ exclusive of 15%, 0 to 10% of $ZrO_2$, 0 to 10% of $Nb_2O_5$ provided that $Ta_2O_5/(Ta_2O_5+ZrO_2+Nb_2O_5)>0.3$, 0 to 20% of $WO_3$ and 0 to 1% of $Sb_2O_3$ and having a refractive index ($n_d$) of 1.80 to 1.84 and an Abbe's number ($v_d$) of 40.0 to 45.0, (2) an optical glass as recited in the above (1), which has an $Li_2O$ and ZnO total content of 20 to 35 mass %, (3) an optical glass as recited in the above (1) or (2), which further contains, by mass %, 0 to 10% of $SiO_2$, 0 to 6% of $Gd_2O_3$ exclusive of 6%, 0 to 10% of $Y_2O_3$ and 0 to 10% of $Yb_2O_3$, (4) an optical glass as recited in the above (3), which has a $B_2O_3$, $Li_2O$, ZnO, $La_2O_3$, $Ta_2O_5$, $ZrO_2$, $Nb_2O_5$, $WO_3$, $SiO_2$, $Gd_2O_3$, $Y_2O_3$, $Yb_2O_3$ and $Sb_2O_3$ total content of 99 mass % or more, (5) a precision press-molding preform formed of the glass recited in any one of the above (1) to (4), (6) A process for the production of a precision press-molding preform, which comprises causing a molten glass to flow out, separating a molten glass gob and shaping the glass gob into a preform formed of the optical glass recited in any one of the above (1) to (4) in the cooling process of said molten glass gob, (7) an optical element formed of the optical glass recited in any one of the above (1) to (4), (8) a process for the production of an optical element, which comprises heating the precision press-molding preform recited in the above (5) or a precision press-molding preform produced by the process recited in the above (6) and precision press-molding the precision press-molding preform with a press mold, (9) a process for the production of an optical element as recited in the above (8), wherein the precision press-molding preform is introduced into the press mold, and the precision press-molding and the press mold are heated together to carry out the precision press-molding, and

(10) a process for the production of an optical element as recited in the above (8), which comprises heating the precision press-molding preform and introducing the precision press-molding preform heated into the press mold pre-heated to carry out the precision press-molding.

According to the present invention, there can be provided a high-refractivity optical glass having both the low-temperature softening property suitable for precision press-molding and excellent glass stability suitable for the hot-shaping of preforms, a precision press-molding preform formed of the above optical glass and a process for the production thereof, and an optical element formed of the above glass and a process for the production thereof.

Figure 1:
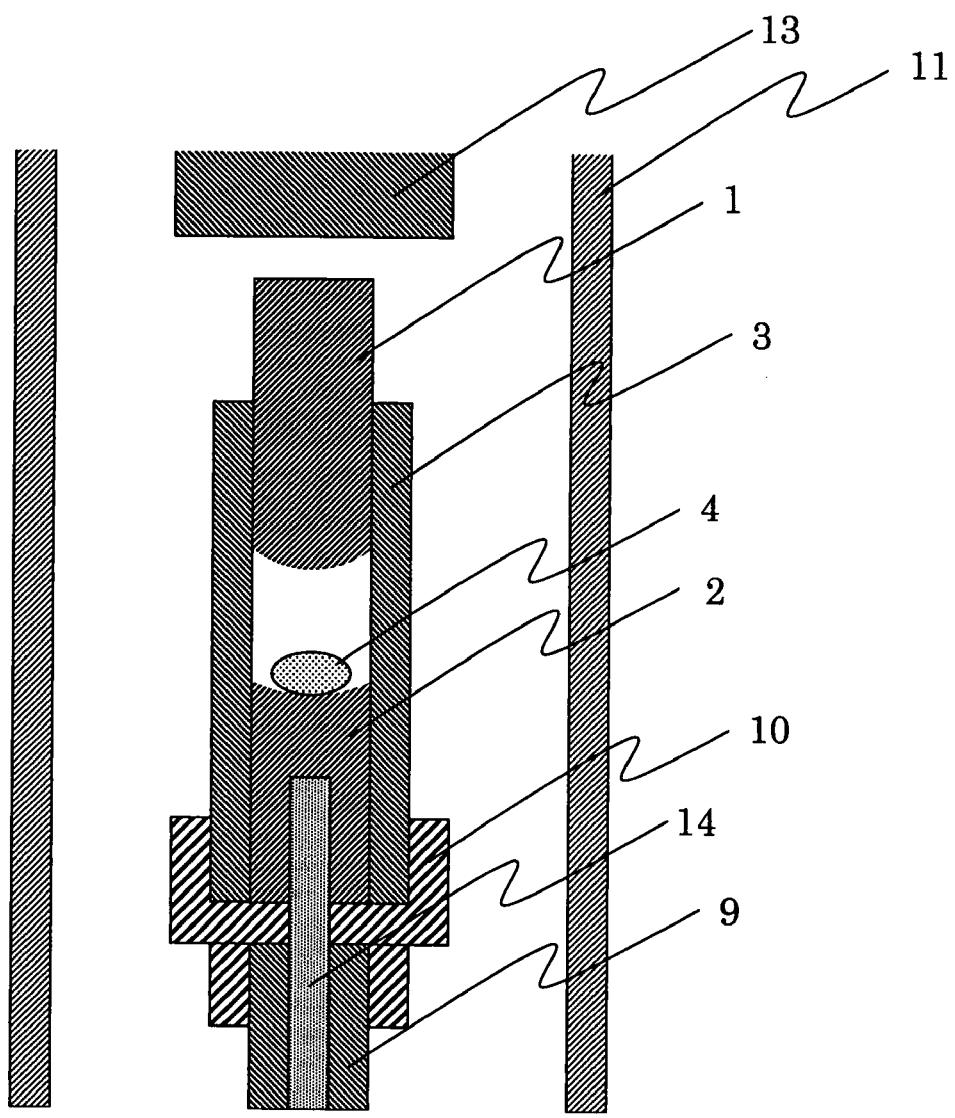
FIG. 1 shows an example of a press apparatus for the production of an optical element of the present invention, in which 1 indicates an upper mold member, 2 indicates a lower mold member, 3 indicates a sleeve member, 4 indicates a preform, 9 indicates a support rod, 10 indicates a support bed, 11 indicates a quartz tube, 13 indicates a pressing rod and 14 indicates a thermocouple.

Preferred embodiments of the invention will be explained in the order of the optical glass of the present invention, the precision press-molding preform, its production process, the optical element and its process.

[Optical Glass]

The optical glass of the present invention comprises, by mass %, 13 to 30% of $B_2O_3$, 0.1 to 4% of $Li_2O$, 17 to 35% of ZnO, 15 to 45% of $La_2O_3$, 4 to 15% of $Ta_2O_5$ exclusive of 15%, 0 to 10% of $ZrO_2$, 0 to 10% of $Nb_2O_5$ provided that $Ta_2O_5/(Ta_2O_5+ZrO_2+Nb_2O_5)>0.3$, 0 to 20% of $WO_3$ and 0 to 1% of $Sb_2O_3$ and has a refractive index ($n_d$) of 1.80 to 1.84 and an Abbe's number ($v_d$) of 40.0 to 45.0, The above $Ta_2O_5/(Ta_2O_5+ZrO_2+Nb_2O_5)$ represents a ratio (mass ratio) of the content (content by mass %) of $Ta_2O_5$ to the total content (total content by mass %) of $Ta_2O_5$, $ZrO_2$ and $Nb_2O_5$.

The optical glass of the present invention will be explained in detail below. Contents of any component and any additive shown by % hereinafter represent such contents by mass %, and content ratios and total contents hereinafter represent ratios and total contents based on a mass.

$B_2O_3$ is an essential component for forming a glass network. When the content of $B_2O_3$ is less than 13%, the glass stability in a high-temperature range is decreased. When it exceeds 30%, it is difficult to attain the intended refractive index. The content of $B_2O_3$ is therefore preferably limited to 13 to 30%. It is preferably in the range of 14 to 29%, more preferably 15 to 28%.

$Li_2O$ is an essential component for decreasing the glass transition temperature while maintaining the high refractivity and imparting the low-temperature softening property suitable for precision press-molding. When the content of $Li_2O$ is less than 0.1%, it is difficult to accomplish the above effects. When it exceeds 4%, the glass stability in a high-temperature range is decreased. The content of $Li_2O$ is therefore limited to 0.1 to 4%. It is preferably in the range of 0.5 to 4%, more preferably over 1% but 4% or less, more preferably 1.1 to 4%, still more preferably 1.1 to 3%.

ZnO is an essential component that works to decrease the glass transition temperature while maintaining the high-refractivity, works to impart the low-temperature softening property suitable for precision press-molding and works to decrease the melting temperature of the glass. When the content of ZnO is less than 17%, it is difficult to attain the above effects. When it exceeds 35%, the glass stability in a high-temperature range is decreased and the dispersion is increased. The content of ZnO is therefore limited to 17 to 35%. It is preferably in the range of 18 to 35%, more preferably 18 to 32%, still more preferably 18 to 30%.

It is preferred to adjust the total content of $Li_2O$ and ZnO to 20 to 35% for realizing a glass suitable for the precision press-molding and the hot-shaping of a preform by maintaining the predetermined optical properties and at the same keeping a balance between a decrease in the glass transition temperature and an improvement in the glass stability. In order to maintain the glass stability under a good condition in spite of the above introduction of a relatively large amount of $Li_2O$ and ZnO, it is required to divide the contents of $Ta_2O_5$, $ZrO_2$ and $Nb_2O_5$ as will be described later.

$La_2O_3$ is an essential component that increases the refractive index while maintaining the dispersion in a desired range and works to improve chemical durability. When the content of $La_2O_3$ is less than 15%, it is difficult to produce the above effects. When it exceeds 45%, the glass stability in a high-temperature range is decreased. The content of $La_2O_3$ is therefore limited to 15 to 45%. It is preferably in the range of 20 to 45%, more preferably 25 to 45%, still more preferably 27 to 45%, yet more preferably 28 to 45%.

$Ta_2O_5$ is an essential component that increases the refractive index while maintaining the dispersion in a desired range and works to improve the glass stability. When the content of $Ta_2O_5$ is less than 4%, it is difficult to produce the above effects. When the content of $Ta_2O_5$ exceeds 15%, the glass stability in a high-temperature range is decreased. The content of $Ta_2O_5$ is therefore limited to 4 to 15% exclusive of 15%. The content of $Ta_2O_5$ in the above range is preferably 6% or more, more preferably 8% or more, still more preferably 8.5% or more. The upper limit of the content of $Ta_2O_5$ is preferably 14.5% or less, more preferably 14% or less, and the content of $Ta_2O_5$ is particularly preferably in the range of 8.5 to 14%.

$ZrO_2$ is a component that works to increase the refractive index and that improves the glass stability when added in a proper amount. When the content of $ZrO_2$ exceeds 10%, the glass stability in a high-temperature region is decreased, and the content thereof is therefore limited to 0 to 10%. The content of $ZrO_2$ is preferably in the range of 0.5 to 10%, more preferably 1 to 10%.

$Nb_2O_5$ is a component that works to increase the refractive index and that improves the glass stability when added in a proper amount. When the content of $Nb_2O_5$ exceeds 10%, the glass stability in a high-temperature region is decreased and the dispersion is increased, so that the content thereof is limited to 0 to 10%. The content of $Nb_2O_5$ is preferably in the range of 0.5 to 10%, more preferably 1 to 10%.

However, the contents of $Ta_2O_5$, $ZrO_2$ and $Nb_2O_5$ are adjusted such that the ratio of the content of $Ta_2O_5$ to the total content of $Ta_2O_5$, $ZrO_2$ and $Nb_2O_5$ ($Ta_2O_5/(Ta_2O_5+ZrO_2+Nb_2O_5)$) is over 0.3. When the above ratio is 0.3 or less, it is difficult to improve the glass stability while maintaining the predetermined optical properties and further decreasing the glass transition temperature. The above ratio is preferably 0.4 or more, more preferably 0.45 or more, still more preferably 0.5 or more.

While the upper limit of the above ratio is 1, it is preferably 0.9 or less, more preferably 0.8 or less. Regarding $Ta_2O_5$, $ZrO_2$ and $Nb_2O_5$, $Ta_2O_5$ is rather introduced in the form of a dispersion thereof in $ZrO_2$ and $Nb_2O_5$ than the content of $Ta_2O_5$ alone is increased. In this case, the glass stability is more improved while imparting the predetermined optical properties and low-temperature softening property. For further improving the above properties, it is preferred to adjust the content of $Ta_2O_5$ such that it is larger than the content of $ZrO_2$, and it is more preferred to adjust the content of $Ta_2O_5$ such that it is larger than the content of $Nb_2O_5$.

$WO_3$ increases the refractive index and works to improve the glass stability when introduced in a proper amount. When the content of $WO_3$ exceeds 20%, however, the glass stability is decreased and the glass is colored to a great extent, so that the content of $WO_3$ is limited to 0 to 20%. The content of $WO_3$ is preferably in the range of 1 to 20%, more preferably 1 to 15%, still more preferably 3 to 14%, yet more preferably 4 to 13%, further more preferably 5 to 13%.

$Sb_2O_3$ may be added as a refining agent. When the content of $Sb_2O_3$ exceeds 1%, the molding surface of a press mold can be damaged during precision press-molding, so that the content of $Sb_2O_3$ is limited to 0 to 1%. The content of $Sb_2O_3$ is preferably in the range of 0 to 0.5%.

$SiO_2$ works to improve the glass stability and impart the glass with a viscosity property suitable for the hot-shaping of a preform when it is introduced in a proper amount. When the content of $SiO_2$ exceeds 10%, the glass transition temperature is increased and the refractive index can be decreased. The content of $SiO_2$ is therefore preferably limited to 0 to 10%. The content of $SiO_2$ is more preferably in the range of 1 to 10%, still more preferably 1 to 9%, yet more preferably 2 to 9%.

From the viewpoint of the production of quality preforms by the hot-shaping, the ratio of the content of $SiO_2$ to the total content of $SiO_2$ and $B_2O_3$ ($SiO_2/(SiO_2+B_2O_3)$) is preferably 0.1 or more, more preferably 0.12 or more, still more preferably over 0.25.

$Gd_2O_3$ works to adjust the optical properties, for example, works to increase the refractive index. The content of $Gd_2O_3$ in the optical glass of the present invention exceeds 6%, the glass stability is decreased. The content of $Gd_2O_3$ is therefore preferably limited to 0 to 6% exclusive of 6%. The content of $Gd_2O_3$ is more preferably in the range of 0 to 5%, still more preferably 0 to 3%, yet more preferably 0 to 1%. $Gd_2O_3$ may not be introduced.

$Y_2O_3$ and $Yb_2O_3$ as well work to adjust the optical properties, for example, works to increase the refractive index. When they are introduced to excess, the glass stability is decreased. The content of each of $Y_2O_3$ and $Yb_2O_3$ is preferably 0 to 10%, more preferably 0 to 5%, still more preferably 0 to 3%, yet more preferably 0 to 1%, and $Y_2O_3$ and $Yb_2O_3$ may not be introduced.

In addition to the above components, $TiO_2$, $Bi_2O_3$, $GeO_2$, BaO, SrO, CaO, MgO, $Na_2O$, $K_2O$, etc., may be introduced.

Both $TiO_2$ and $Bi_2O_3$ increase the dispersion and color the glass. It is therefore imperative that the content of each of them should be limited to less than 1%, and it is more preferably limited to 0.5% or less. Still more preferably, none of these is incorporated.

The object of the present invention can be accomplished without introducing $GeO_2$. Further, since $GeO_2$ is a very expensive material, the content thereof is to be limited to less than 2%, more preferably, to less than 1%, still more preferably, to less than 0.5%. Yet more preferably, $GeO_2$ is not introduced.

Bao works to improve the glass stability and meltability when added in a small amount. As compared with ZnO that similarly works, however, BaO less works to increase the refractive index and less works to decrease the glass transition temperature, so that it is not expedient for obtaining a glass having a high refractive index and a low glass transition temperature to introduce BaO in place of ZnO. The content of BaO is therefore preferably limited to the range of 0 to 3%, more preferably to 0 to 1%. Still more preferably, BaO is not introduced.

SrO, CaO and MgO work to adjust the optical properties when introduced in a small amount. Since, however, they work to decrease the refractive index, the introduction thereof is not expedient. The content of each of SrO, CaO and MgO is therefore preferably limited to the range of 0 to 3%, more preferably to 0 to 1%. Still more preferably, none of them is introduced.

$Na_2O$ and $K_2O$ works to increase the meltability and decrease the glass transition temperature, while they also work to decrease the refractive index. In contrast, $Li_2O$ works to decrease the glass transition temperature while maintaining a high refractive index, and it is hence not expedient to introduce $Na_2O$ and $K_2O$ in place of $Li_2O$. The content of each of $Na_2O$ and $K_2O$ is therefore preferably limited to the range of 0 to 5%, more preferably to 0 to 3%, still more preferably to 0 to 1%, and yet more preferably none of these is introduced.

Besides these, it is not desirable to introduce any one of $As_2O_3$, PbO, CdO, $ThO_2$, $Lu_2O_3$ and F. $As_2O_3$, PbO, CdO and $ThO_2$ are environmentally undesirable substances. Further, $As_2O_3$ also has strong acidity and hence damages the molding surface of a press mold during precision press-molding to decrease the lifetime of the press mold. When precision press-molding is carried out in the atmosphere of a non-oxidizing gas such as a forming gas, PbO is reduced to precipitate on the glass surface and adheres to a molding surface to decrease the surface accuracy of an optical element. $Lu_2O_3$ is an expensive material and adds to a cost. It is hence not preferred to introduce $Lu_2O_3$. F is highly volatile and causes striae during the hot-shaping of a preform, so that it is not preferred to introduce F.

Besides these, it is imperative that substances which cause the coloring of the glass, such as Cu, Cr, Co, etc., should not be introduced.

For obtaining a glass that satisfies the above various properties and that is more suitable for the hot-shaping of a preform and the precision press-molding, the total content of $B_2O_3$, $Li_2O$, ZnO, $La_2O_3$, $Ta_2O_5$, $ZrO_2$, $Nb_2O_5$, $WO_3$, $SiO_2$, $Gd_2O_3$, $Y_2O_3$, $Yb_2O_3$ and $Sb_2O_3$ in the optical glass of the present invention is preferably 99% or more, more preferably 99.5% or more and still more preferably 100%. Further, the total content of $B_2O_3$, $Li_2O$, ZnO, $La_2O_3$, $Ta_2O_5$, $ZrO_2$, $Nb_2O_5$, $WO_3$, $SiO_2$ and $Sb_2O_3$ in the optical glass of the present invention is preferably 99% or more, more preferably 99.5% or more and still more preferably 100%.

The optical glass of the present invention has an refractive index ($n_d$) in the range of 1.80 to 1.84 and an Abbe's number ($v_d$) in the range of 40.0 to 45.0. For improving the glass stability and at the same time decreasing the glass transition temperature, the refractive index ($n_d$) is preferably in the range of 1.80 to 1.83, more preferably 1.80 to 1.82, and the Abbe's number ($v_d$) is preferably in the range of 40.0 to 44.0, more preferably 40.0 to 43.0.

The present invention is suitable for obtaining an optical glass having a glass transition temperature of 550° C. or lower, preferably 545° C. or lower, more preferably 540° C. or lower, still more preferably 535° C. or lower.

Further, the present invention is suitable for obtaining an optical glass having a light transmittance represented by a coloring degree $\lambda_{80}$ of 420 nm or less. The coloring degree $\lambda_{80}$ is a wavelength at which the spectral transmittance obtained by providing a glass sample having optically polished surfaces opposed to each other in parallel at a distance of 10.0±0.1 mm and causing light to enter one of the above surfaces at right angles comes to be 80%. The spectral transmittance is measured in a wavelength of 280 to 700 nm and is represented by a ratio ($I_{out}/I_{in}$) of the intensity $I_{out}$ of transmitted light to the intensity $I_{in}$ of light that enters the sample, and it includes a value including a reflection loss on the sample surface. The spectral transmittance of the optical glass of the present invention is 80% or more in a wavelength range of at least $\lambda_{80}$ but not more than 700 nm. When a glass has a refractive index of 1.80 or more and has a coloring degree $\lambda_{80}$ of 420 nm or less, preferably 415 nm or less, there can be obtained an optical element formed of a high-refractivity glass free or almost free of coloring. Further, having a low glass transition temperature and also making it easy to carry out the precision press-molding of an aspherical lens, the optical glass of the present invention is suitable for a lens constituting a high-performance and compact image-sensing system.

Since the optical glass of the present invention generally has a specific gravity of less than 5.0, it is easier to stably float a molten glass gob when the molten glass gob is shaped into a preform while it is caused to float above a shaping mold. Therefore, the optical glass of the present invention enables highly productive production of quality preforms although it is a glass having a high refractive index.

While the optical glass and preferred embodiments of the same have been explained hereinabove, some preferred embodiments will be described below as examples.

(Optical Glass 1-1)
An optical glass comprising 13 to 30% of $B_2O_3$, 0.1 to 4% of $Li_2O$, 17 to 35% of ZnO provided that the total content of $Li_2O$ and ZnO is 20 to 35%), 15 to 45% of $La_2O_3$, 4 to 15% of $Ta_2O_5$ exclusive of 15%, 0.5 to 10% of $ZrO_2$, 0.5 to 10% of $Nb_2O_5$ provided that $Ta_2O_5/(Ta_2O_5+ZrO_2+Nb_2O_5) > 0.3$, 1 to 20% of $WO_3$, 0 to 10% of $SiO_2$, 0 to 6% of $Gd_2O_3$ exclusive of 6%, 0 to 10% of $Y_2O_3$, 0 to 10% of $Yb_2O_3$ and 0 to 1% of $Sb_2O_3$ and having a refractive index ($n_d$) of 1.80 to 1.84 and an Abbe's number ($v_d$) of 40.0 to 45.0.

(Optical Glass 1-2)
An optical glass that is included in the optical glass 1-1 and that has a $Gd_2O_3$ content of 0 to 5%.

(Optical Glass 1-3)
An optical glass that is included in the optical glass 1-1 or 1-2 and that has an $SiO_2$ content of 1 to 10%.

(Optical glass 1-4)
An optical glass that is included in any one of the optical glasses 1-1 to 1-3 and that has an $Li_2O$ content of 1.1 to 4%.

(Optical Glass 1-5)
An optical glass that is included in any one of the optical glasses 1-1 to 1-4 and that has a $Ta_2O_5$ content of over 8% but not more than 14%.

(Optical Glass 1-6)
An optical glass that is included in the optical glass 1-5 and that has $Ta_2O_5$ content of 8.5 to 14%.

(Optical Glass 1-7)
An optical glass that is included in any one of the optical glasses 1-1 to 1-6 and that has a $Ta_2O_5/(Ta_2O_5+ZrO_2+Nb_2O_5)$ ratio of 0.5 or more.

(Optical Glass 1-8)
An optical glass that is included in any one of the optical glasses 1-1 to 1-7 and that has a $Ta_2O_5$ content larger than a $ZrO_2$ content.

(Optical Glass 1-9)
An optical glass that is included in any one of the optical glasses 1-1 to 1-8 and that has a $Ta_2O_5$ content larger than a $Nb_2O_5$ content.

(Optical Glass 1-10)
An optical glass that is included in any one of the optical glasses 1-1 to 1-9 and that has a $B_2O_3$, $Li_2O$, ZnO, $La_2O_3$, $Ta_2O_5$, $ZrO_2$, $Nb_2O_5$, $WO_3$, $SiO_2$, $Gd_2O_3$, $Y_2O_3$, $Yb_2O_3$ and $Sb_2O_3$ total content of 99% or more.

(Optical Glass 1-11)
An optical glass that is included in any one of the optical glasses 1-1 to 1-10 and that has a $B_2O_3$, $Li_2O$, ZnO, $La_2O_3$, $Ta_2O_5$, $ZrO_2$, $Nb_2O_5$, $WO_3$, $SiO_2$ and $Sb_2O_3$ total content of 99% or more.

(Optical Glass 2-1)
An optical glass comprising 13 to 30% of $B_2O_3$, 1.1 to 4% of $Li_2O$, 17 to 35% of ZnO provided that the total content of $Li_2O$ and ZnO is 20 to 35%, 15 to 45% of $La_2O_3$, 8.5 to 14% of $Ta_2O_5$, 0 to 10% of $ZrO_2$, 0 to 10% of $Nb_2O_5$ provided that $Ta_2O_5/(Ta_2O_5+ZrO_2+Nb_2O_5) > 0.3$, 0 to 20% of $WO_3$, 0 to 10% of $SiO_2$, 0 to 5% of $Gd_2O_3$, 0 to 10% of $Y_2O_3$, 0 to 10% of $Yb_2O_3$ and 0 to 1% of $Sb_2O_3$ and having a refractive index ($n_d$) of 1.80 to 1.84 and an Abbe's number ($v_d$) of 40.0 to 45.0.

(Optical Glass 2-2)
An optical glass that is included in the optical glass 2-1 and that has a $Ta_2O_5/(Ta_2O_5+ZrO_2+Nb_2O_5)$ ratio of 0.5 or more.

(Optical Glass 2-3)
An optical glass that is included in the optical glass 2-1 or 2-2 and that has a $Ta_2O_5$ content larger than a $ZrO_2$ content.

(Optical Glass 2-4)
An optical glass that is included in any one of the optical glasses 2-1 to 2-3 and that has a $Ta_2O_5$ content larger than an $Nb_2O_5$ content.

(Optical Glass 2-5)
An optical glass that is included in any one of the optical glasses 2-1 to 2-4 and that has a $B_2O_3$, $Li_2O$, ZnO, $La_2O_3$, $Ta_2O_5$, $ZrO_2$, $Nb_2O_5$, $WO_3$, $SiO_2$, $Gd_2O_3$, $Y_2O_3$, $Yb_2O_3$ and $Sb_2O_3$ total content of 99% or more.

(Optical Glass 2-6)
An optical glass that is included in the optical glass 2-5 and that has a $B_2O_3$, $Li_2O$, ZnO, $La_2O_3$, $Ta_2O_5$, $ZrO_2$, $Nb_2O_5$, $WO_3$, $SiO_2$ and $Sb_2O_3$ total content of 99% or more.

The above optical glasses can be obtained by weighing and formulating oxides, carbonates, sulfates, nitrates, hydroxides, etc., as raw materials so as to obtain an intended glass composition, fully mixing these raw materials to prepare a mixture batch, carrying out the heating, melting, defoaming and stirring of the batch in a melting vessel to obtain a bubbles-free molten glass and shaping the glass. Specifically, they can be made according to a known melting method.

[Precision Press-Molding Preform and Process for the Production of Precision Press-Molding Preform]

The precision press-molding preform of the present invention (to be referred to as "preform" hereinafter) is formed of the optical glass of the present invention.

The preform is a glass shaped material having a mass equivalent to the mass of a precision press-molded product and having a proper form shaped depending upon the form of the precision press-molded product. Examples of the form thereof include a spherical form, an ellipsoidal form, and the like. The preform is heated so as to have a precision press-moldable viscosity before it is supplied for precision press-molding.

The preform of the present invention may have a carbon-containing film (preferably, a carbon film) formed on its surface as required.

The process for the production of a precision press-molding preform, provided by the present invention, comprises causing a molten glass to flow out, separating a molten glass gob and shaping the molten glass gob to a preform formed of the above optical glass in the cooling process of said molten glass gob, and it is one of processes for the production of the preform of the present invention.

Since the glass for constituting a preform has high stability in a high-temperature range, the viscosity of a molten glass when the molten glass is caused to flow out can be increased, so that the above process has an advantage that quality preforms can be highly productively produced.

In the preform production process of the present invention, a molten glass is caused to flow out of a pipe and a molten glass gob is separated and shaped into a preform of any one of the above optical glasses in the cooling process of the above molten glass gob. However, the process for the production of a preform shall not be limited to the above process, and the preform of the present invention can be also produced by preparing a glass shaped material from a molten glass, cutting or splitting the glass shaped material and carrying out the grinding and polishing of a cut piece.

In the preform production process of the present invention in which a molten glass gob is separated, a molten glass is separated to obtain the molten glass gob, so that the mass accuracy of a preform can be excellent over that in the splitting of a solidified glass. Further, since a preform is shaped directly from a molten glass gob, no cutting, grinding and polishing glass dusts occur. Therefore, the production efficiency is improved and the utilization ratio of a glass is also improved, so that the production cost can be kept low even if an expensive raw material is used. Further, for cutting, grinding and polishing, it is required to fully decrease the strain of a shaped glass, and it is required to carry out annealing for a long period of time. According to the process of the present invention, however, the time period for annealing can be decreased.

In the preform production process of the present invention, preferably, a preform is shaped while a glass gob is caused to float by applying a gas pressure, for imparting the preform with a smooth and clean surface. Further, a preform whose surface is formed of a free surface is preferred. Further, a preferred free of a cutting mark called a shear mark is preferred. The shear mark is formed when a flowing molten glass is cut with a cutting blade. When the shear mark remains up to the stage of obtaining a precision press-molded product, such a portion is defective. It is therefore preferred to be free of the shear mark at the stage of a preform. The method for separating, without using a cutting blade, a molten glass without forming the shear mark includes a method in which a molten glass is dropped from a flow pipe, a method in which the forward end of flow of a molten glass that is flowing out of a flow pipe is supported and the support is removed timely when a molten glass gob having a predetermined weight can be separated (called "falling-separation method") and the like. In the falling-separation method, a molten glass flow can be separated at a narrow portion formed between the forward end side and the flow pipe outlet side of the molten glass flow to obtain a molten glass gob having a predetermined weight. Then, the molten glass gob is shaped into a preform having a form suitable for press molding while it is in a softened state.

[Optical Element and Process for the Production of Optical Element]

The optical element of the present invention is formed of the above optical glass of the present invention. The optical element of the present invention has high-refractivity low-dispersion properties like the optical glass of the present invention constituting the optical element.

The optical element of the present invention includes, for example, various lenses such as a spherical lens, an aspherical lens, a microlens, etc., a diffraction grating, a lens with a diffraction grating, a lens array, a prism and the like. From the viewpoint of forms, the optical element includes, for example, a concave meniscus lens, a biconcave lens, a plano-concave lens, a convex meniscus lens and a biconvex lens a plano-convex lens. The above optical element is preferably an optical element obtained by the heating and precision press-molding of the preform of the present invention.

The optical element may be provided with an anti-reflection film, a total reflection film, a partial reflection film or a film having spectral properties or the like as required.

The process for the production of an optical element will be explained below.

The process for the production of an optical element, provided by the present invention, comprises heating the precision press-molding preform of the present invention or a precision press-molding preform produced by the precision press-molding preform production process of the present invention and precision press-molding the preform with a press mold.

The precision press-molding is also called "optics molding", and it is well known in the technical field to which the present invention pertains.

That surface of an optical element which transmits, refracts, diffracts or reflects light is called an optical-function surface. For example, the lens surface of a lens, such as an aspherical surface of an aspherical lens, a spherical surface of a spherical lens, or the like corresponds to the optical-function surface. The precision press-molding method refers to a method in which the form of molding surface of a press mold is precisely transferred to a glass by press-molding to form an optical-function surface. That is, the precision press-molding obviates machine processes such as grinding, polishing, etc., for completing an optical-function surface.

Therefore, the optical element production process of the present invention is suitable for producing optical elements such as a lens, a lens array, a diffraction grating, a prism, etc., and in particular it is the most suitable for producing aspherical lenses with high productivity.

According to the optical element production process of the present invention, not only an optical element having the above optical properties can be produced, but also the pressing can be carried out at a relatively low temperature for press-molding of a glass since a preform formed of the optical glass having a low-temperature softening property, so that a burden on the molding surface of a press mold is decreased and that the lifetime of the press mold (or a mold release film if it is formed on the molding surface) can be hence extended. Further, since the glass constituting the preform has high stability, the devitrification of the glass can be effectively prevented in the re-heating and pressing steps. Further, a series of steps starting with the melting of a glass and ending with the completion of an end product can be highly productively carried out.

Of high-refractivity glasses for precision press-molding, the optical glass of the present invention has a low glass transition temperature due to the use of the above glass having relatively large contents of $Li_2O$ and $ZnO$. This point is advantageous for precision press-molding for the production of lenses having negative refractive power, such as a concave meniscus lens, a biconcave lens and a plano-concave lens. In the pressing for the production of such a lens, a preform is arranged in the center of inside of a press mold and the glass constituting the preform is extended by pressing to form a lens whose central portion has a thickness larger than the thickness of a circumferential portion. In this step, a change in the volume distribution of the glass is greater than a change in the volume distribution of a glass for a lens having positive refractive power. In the above molding, desirably, a lower viscosity of the glass is set during pressing so that the extending of the glass during the pressing is improved. For this purpose, the temperature for the pressing is set at a higher temperature. When an optical glass having a glass transition temperature of 550° C. or lower, preferably 535° C. or lower, is used like the present invention, there can be produced an effect that the abrasion of a press mold is not fostered even if the temperature for the pressing is set at a higher temperature.

Further, the above lens having negative refractive power can correct chromatic aberration by a compact constitution in which it is combined with a lens formed of a high-dispersion glass having positive refractive power.

As a press mold for the precision press-molding, there can be used a known press mold such as a press mold obtained by forming a mold release film on the molding surface of a mold material such as silicon carbide, an ultrahard material or stainless steel. The mold release film can be selected from a carbon-containing film, a noble metal alloy film or the like. The press mold has an upper mold member, a lower mold member and optionally a sleeve member. Above all, for effectively decreasing or preventing the breaking of a glass molded product during press-molding, it is preferred to use a press mold made of silicon carbide or a press mold made of an ultrahard alloy (in particular a press mold made of a binder-free ultrahard alloy, such as a press mold made of WC), and the above mold more preferably has a molding surface provided with a carbon-containing film as a mold release film.

In the precision press-molding method, it is preferred to employ a non-oxidizing gas atmosphere as an atmosphere during molding for maintaining the molding surface of a press mold under good conditions. The non-oxidizing gas is preferably selected from nitrogen or a mixture of nitrogen with hydrogen. In particular, when a press mold having a carbon-containing film formed on a molding surface is used or when a press mold made of silicon carbide is used, it is imperative that the precision press-molding should be carried out in the above non-oxidizing atmosphere.

The precision press-molding particularly suitable for the production of the optical element of the present invention will be explained below.

(Precision Press-Molding Method 1)

This method is a method in which a precision press-molding preform is introduced into a press mold, the preform and the press mold are heated together and precision press-molding is carried out (to be referred to as "precision press-molding method 1" hereinafter).

In the precision press-molding method 1, preferably, both the press mold and the above preform are heated to a temperature at which a glass constituting the preform exhibits a viscosity of $10^6$ to $10^{12}$ dPa·s and the precision press-molding is carried out.

Further, it is desirable to cool a precision press-molded product (and the press mold) to a temperature at which the above glass exhibits a viscosity of $10^{12}$ dPa·s, or more, more preferably $10^{14}$ dPa·s or more, still more preferably $10^{16}$ dPa·s before the precision press-molded product is taken out of the press mold.

Under the above conditions, not only the form of molding surface of the press mold can be precisely transferred to the glass, but also the precision press-molded product can be taken out without any deformation.

This method is a method in which a hot precision press-molding preform (prepared by pre-heating) is introduced to a pre-heated press mold and the precision press-molding is carried out (to be referred to as "precision press-molding method 2" hereinafter). According to this method, the preform is pre-heated before introduced into the press mold, so that an excellent optical element free of a surface defect can be produced while the cycle time can be decreased.

The press mold is preferably pre-heated at a temperature lower than the temperature for pre-heating the above preform. By such pre-heating, the temperature for heating the press mold can be thus controlled to be lower, so that the abrasion of the press mold can be decreased.

In the precision press-molding method 2, preferably, the preform is heated to a temperature at which a glass constituting the above preform exhibits a viscosity of $10^9$ dPa·s or less, more preferably $10^9$ dPa·s.

The above preform is preferably pre-heated while it is caused to float, and it is further preferred to pre-heat the above preform to a temperature at which a glass constituting the preform exhibits a viscosity of $10^{5.5}$ to $10^9$ dPa·s, more preferably at least $10^{5.5}$ but less than $10^9$ dPa·s.

Further, it is preferred to start the cooling of the glass simultaneously with the start of the pressing or during pressing.

The above press mold is preferably temperature-adjusted to a temperature lower than the pre-heating temperature for the above preform, and a temperature at which the above glass exhibits a viscosity of $10^9$ to $10^{12}$ dPa·s can be a target temperature for the adjustment of temperature of the press mold.

In the above method, preferably, a precision press-molded product is cooled to a temperature at which the glass has a viscosity of $10^{12}$ dPa·s or more before it is taken out of the press mold.

The precision press-molded product (optical element) is taken out of the press mold and gradually cooled as required. When the product is an optical element such as a lens, the surface thereof may be coated with an optical thin film as required.

The above optical element such as an aspherical lens is suitable as a part for a high-performance and compact image-sensing system and is suitable for use in an image sensing system such as a digital camera, a digital video camera, a camera mounted on a cellphone, an in-vehicle camera or the like.

EXAMPLES

The present invention will be further explained in detail below with reference to Examples.

Tables 1 to 7 show compositions of glasses of Examples 1 to 37. These glasses were obtained as follows. Oxides, hydroxides, carbonate and nitrates corresponding to components of a glass were used as materials for the glass, these materials were weighed so as to obtain a composition shown in Tables 1 to 7 after the formation of a glass and fully mixed. The mixture was charged into a platinum crucible, melted at a temperature of about 1,200° C. in an electric furnace, homogenized by stirring, refined and then cast into a mold pre-heated to a proper temperature. The cast glass was cooled to a glass transition temperature and immediately thereafter the glass was placed in an annealing furnace and gradually cooled to room temperature to give an optical glass.

Each of optical glasses obtained in the above manner was measured for a refractive index ($n_d$), an Abbe's number ($v_d$), a glass transition temperature, a sag temperature and a specific gravity by the following methods. Tables 1 to 7 show the results.

(1) Refractive index ($n_d$) and Abbe's number ($v_d$)

An optical glass obtained after gradual cooling at a temperature decrease rate of −30° C./hour was measured.

(2) Glass transition temperature ($T_g$) and sag temperature ($T_s$)

An optical glass measured with an apparatus for thermomechanical analysis supplied by Rigaku Corporation at a temperature elevation rate of 4° C./minute.

(3) Specific Gravity

An optical glass was measured by an Archimedean method.

TABLE 1

|  | 1 | 2 | 3 | 4 | 5 |
|---|---|---|---|---|---|
| $B_2O_3$ | 20.26 | 20.78 | 20.63 | 20.39 | 20.62 |
| $Li_2O$ | 0.87 | 1.31 | 1.30 | 1.28 | 1.30 |
| ZnO | 20.29 | 21.27 | 21.12 | 20.87 | 21.10 |
| $Li_2O + ZnO$ | 21.15 | 22.58 | 22.41 | 22.16 | 22.40 |
| $La_2O_3$ | 34.82 | 34.36 | 34.11 | 33.74 | 34.10 |
| $Ta_2O_5$ | 6.43 | 6.74 | 5.24 | 8.05 | 5.23 |
| $ZrO_2$ | 3.59 | 3.76 | 3.73 | 3.69 | 2.92 |
| $Nb_2O_5$ | 2.19 | 5.82 | 4.90 | 3.11 | 5.77 |
| $Ta_2O_5/(Ta_2O_5 + ZrO_2 + Nb_2O_5)$ | 0.53 | 0.41 | 0.38 | 0.54 | 0.38 |
| $WO_3$ | 8.51 | 2.77 | 5.80 | 5.74 | 5.80 |
| $SiO_2$ | 3.04 | 3.19 | 3.17 | 3.13 | 3.16 |
| $SiO_2/(SiO_2 + B_2O_3)$ | 0.13 | 0.13 | 0.13 | 0.13 | 0.13 |
| $Gd_2O_3$ | 0.00 | 0.00 | 0.00 | 0.00 | 0.00 |
| Total | 100.00 | 100.00 | 100.00 | 100.00 | 100.00 |
| Refractive index ($n_d$) | 1.8121 | 1.8118 | 1.8107 | 1.8093 | 1.8118 |
| Abbe's number ($v_d$) | 40.7 | 40.7 | 40.6 | 41 | 40.2 |
| Glass transition temperature Tg (° C.) | 545 | 531 | 531 | 533 | 530 |
| Sag temperature (° C.) | 591 | 577 | 577 | 578 | 577 |
| λ80 (nm) | 393 | 400 | 397 | 395 | 401 |
| Specific gravity | 4.69 | 4.56 | 4.57 | 4.63 | 4.57 |

(Note)
Contents of components and total contents of components represent mass%, and ratios of contents to total contents represent mass ratios.

TABLE 2

|  | 6 | 7 | 8 | 9 | 10 |
|---|---|---|---|---|---|
| $B_2O_3$ | 20.49 | 20.38 | 20.37 | 20.25 | 20.27 |
| $Li_2O$ | 1.29 | 1.28 | 1.28 | 1.27 | 1.28 |
| ZnO | 20.97 | 20.86 | 20.85 | 20.73 | 20.74 |
| $Li_2O + ZnO$ | 22.26 | 22.14 | 22.13 | 22.00 | 22.02 |
| $La_2O_3$ | 33.87 | 33.7 | 33.68 | 33.49 | 33.50 |
| $Ta_2O_5$ | 6.65 | 8.05 | 8.04 | 9.43 | 9.43 |
| $ZrO_2$ | 2.09 | 2.89 | 2.08 | 2.07 | 2.87 |
| $Nb_2O_5$ | 5.74 | 3.98 | 4.84 | 3.95 | 3.10 |
| $Ta_2O_5/(Ta_2O_5 + ZrO_2 + Nb_2O_5)$ | 0.46 | 0.54 | 0.54 | 0.61 | 0.61 |
| $WO_3$ | 5.76 | 5.73 | 5.73 | 5.70 | 5.70 |
| $SiO_2$ | 3.14 | 3.13 | 3.13 | 3.11. | 3.11 |
| $SiO_2/(SiO_2 + B_2O_3)$ | 0.13 | 0.13 | 0.13 | 0.13 | 0.13 |
| $Gd_2O_3$ | 0.00 | 0.00 | 0.00 | 0.00 | 0.00 |
| Total | 100.00 | 100.00 | 100.00 | 100.00 | 100.00 |
| Refractive index ($n_d$) | 1.8123 | 1.8105 | 1.8115 | 1.8107 | 1.8099 |
| Abbe's number ($v_d$) | 40.1 | 40.6 | 40.3 | 40.4 | 40.8 |
| Glass transition temperature Tg (° C.) | 530 | 532 | 532 | 532 | 533 |
| Sag temperature (° C.) | 577 | 578 | 577 | 579 | 579 |
| λ80 (nm) | 407 | 393 | 393 | 394 | 402 |
| Specific gravity | 4.60 | 4.63 | 4.62 | 4.65 | 4.66 |

(Note)
Contents of components and total contents of components represent mass%, and ratios of contents to total contents represent mass ratios.

TABLE 3

|  | 11 | 12 | 13 | 14 | 15 |
|---|---|---|---|---|---|
| $B_2O_3$ | 20.14 | 20.02 | 19.58 | 19.06 | 18.54 |
| $Li_2O$ | 1.27 | 1.26 | 1.68 | 1.68 | 1.67 |
| ZnO | 20.61 | 20.50 | 20.97 | 20.90 | 20.83 |
| $Li_2O + ZnO$ | 21.88 | 21.76 | 22.65 | 22.57 | 22.50 |
| $La_2O_3$ | 33.30 | 33.11 | 33.88 | 33.77 | 33.67 |
| $Ta_2O_5$ | 10.79 | 12.15 | 8.09 | 8.06 | 8.04 |
| $ZrO_2$ | 2.06 | 2.05 | 2.90 | 2.89 | 2.88 |
| $Nb_2O_5$ | 3.08 | 2.21 | 4.00 | 3.98 | 3.97 |
| $Ta_2O_5/(Ta_2O_5 + ZrO_2 + Nb_2O_5)$ | 0.68 | 0.74 | 0.54 | 0.54 | 0.54 |
| $WO_3$ | 5.66 | 5.63 | 5.76 | 5.74 | 5.72 |
| $SiO_2$ | 3.09 | 3.07 | 3.14 | 3.92 | 4.68 |
| $SiO_2/(SiO_2 + B_2O_3)$ | 0.13 | 0.13 | 0.14 | 0.17 | 0.20 |
| $Gd_2O_3$ | 0.00 | 0.00 | 0.00 | 0.00 | 0.00 |
| Total | 100.00 | 100.00 | 100.00 | 100.00 | 100.00 |
| Refractive index ($n_d$) | 1.8104 | 1.8095 | 1.8127 | 1.8114 | 1.8094 |
| Abbe's number ($v_d$) | 40.6 | 40.8 | 40.4 | 40.4 | 40.5 |
| Glass transition temperature Tg (° C.) | 533 | 533 | 519 | 521 | 524 |
| Sag temperature (° C.) | 580 | 580 | 565 | 569 | 572 |
| λ80 (nm) | 393 | 396 | 397 | 404 | 398 |
| Specific gravity | 4.68 | 4.70 | 4.63 | 4.64 | 4.62 |

(Note)
Contents of components and total contents of components represent mass%, and ratios of contents to total contents represent mass ratios.

TABLE 4

|  | 16 | 17 | 18 | 19 | 20 |
|---|---|---|---|---|---|
| $B_2O_3$ | 17.52 | 20.12 | 16.30 | 16.87 | 16.56 |
| $Li_2O$ | 1.66 | 1.28 | 2.25 | 1.84 | 2.04 |
| ZnO | 20.70 | 20.83 | 20.86 | 20.61 | 20.70 |
| $Li_2O + ZnO$ | 22.35 | 22.11 | 23.11 | 22.45 | 22.74 |
| $La_2O_3$ | 33.43 | 33.65 | 33.69 | 33.29 | 33.44 |
| $Ta_2O_5$ | 7.99 | 8.04 | 8.05 | 8.80 | 8.84 |
| $ZrO_2$ | 2.86 | 2.89 | 2.89 | 3.33 | 3.10 |
| $Nb_2O_5$ | 3.95 | 3.97 | 3.98 | 3.42 | 3.43 |
| $Ta_2O_5/(Ta_2O_5 + ZrO_2 + Nb_2O_5)$ | 0.54 | 0.54 | 0.54 | 0.57 | 0.58 |
| $WO_3$ | 5.69 | 5.72 | 5.73 | 5.66 | 5.69 |
| $SiO_2$ | 6.20 | 3.51 | 6.25 | 6.18 | 6.20 |
| $SiO_2/(SiO_2 + B_2O_3)$ | 0.26 | 0.15 | 0.28 | 0.27 | 0.27 |
| $Gd_2O_3$ | 0.00 | 0.00 | 0.00 | 0.00 | 0.00 |
| Total | 100.00 | 100.00 | 100.00 | 100.00 | 100.00 |

TABLE 4-continued

|  | 16 | 17 | 18 | 19 | 20 |
|---|---|---|---|---|---|
| Refractive index ($n_d$) | 1.8064 | 1.8099 | 1.8084 | 1.8082 | 1.8082 |
| Abbe's number ($v_d$) | 40.6 | 40.5 | 40.3 | 40.5 | 40.4 |
| Glass transition temperature Tg (° C.) | 529 | 532 | 512 | 523 | 516 |
| Sag temperature (° C.) | 575 | 579 | 560 | 571 | 567 |
| λ80 (nm) | 400 | 392 | 394 | 395 | 395 |
| Specific gravity | 4.60 | 4.63 | 4.61 | 4.63 | 4.63 |

(Note)
Contents of components and total contents of components represent mass%, and ratios of contents to total contents represent mass ratios.

TABLE 5

|  | 21 | 22 | 23 | 24 | 25 |
|---|---|---|---|---|---|
| $B_2O_3$ | 17.50 | 16.25 | 17.13 | 15.90 | 17.17 |
| $Li_2O$ | 2.04 | 1.65 | 2.03 | 1.64 | 2.03 |
| ZnO | 18.97 | 22.20 | 18.82 | 22.02 | 18.86 |
| $Li_2O + ZnO$ | 21.02 | 23.85 | 20.84 | 23.66 | 20.90 |
| $La_2O_3$ | 33.74 | 32.87 | 34.50 | 33.62 | 33.56 |
| $Ta_2O_5$ | 8.92 | 8.69 | 8.85 | 8.62 | 8.87 |
| $ZrO_2$ | 3.37 | 3.28 | 3.34 | 3.26 | 4.15 |
| $Nb_2O_5$ | 3.46 | 3.37 | 3.43 | 3.35 | 3.44 |
| $Ta_2O_5/(Ta_2O_5 + ZrO_2 + Nb_2O_5)$ | 0.57 | 0.57 | 0.57 | 0.57 | 0.54 |
| $WO_3$ | 5.74 | 5.59 | 5.69 | 5.54 | 5.70 |
| $SiO_2$ | 6.26 | 6.10 | 6.21 | 6.05 | 6.22 |
| $SiO_2/(SiO_2 + B_2O_3)$ | 0.26 | 0.27 | 0.27 | 0.28 | 0.27 |
| $Gd_2O_3$ | 0.00 | 0.00 | 0.00 | 0.00 | 0.00 |
| Total | 100.00 | 100.00 | 100.00 | 100.00 | 100.00 |
| Refractive index ($n_d$) | 1.8046 | 1.8116 | 1.8076 | 1.8146 | 1.8083 |
| Abbe's number ($v_d$) | 40.6 | 40.2 | 40.7 | 40.2 | 40.5 |
| Glass transition temperature Tg (° C.) | 522 | 523 | 522 | 524 | 523 |
| Sag temperature (° C.) | 572 | 573 | 573 | 574 | 573 |
| λ80 (nm) | 393 | 394 | 393 | 400 | 401 |
| Specific gravity | 4.59 | 4.67 | 4.60 | 4.69 | 4.60 |

(Note)
Contents of components and total contents of components represent mass%, and ratios of contents to total contents represent mass ratios.

TABLE 6

|  | 26 | 27 | 28 | 29 | 30 |
|---|---|---|---|---|---|
| $B_2O_3$ | 17.07 | 17.00 | 17.8 | 17.23 | 18.01 |
| $Li_2O$ | 2.02 | 1.50 | 1.41 | 1.59 | 1.31 |
| ZnO | 18.75 | 24.38 | 25.08 | 22.92 | 25.05 |
| $Li_2O + ZnO$ | 20.76 | 25.87 | 26.49 | 24.52 | 26.36 |
| $La_2O_3$ | 33.31 | 32.24 | 31.44 | 32.47 | 31.38 |
| $Ta_2O_5$ | 10.24 | 7.95 | 8.01 | 7.96 | 8.00 |
| $ZrO_2$ | 3.33 | 3.33 | 3.35 | 3.33 | 3.35 |
| $Nb_2O_5$ | 3.42 | 3.42 | 3.44 | 3.42 | 3.44 |
| $Ta_2O_5/(Ta_2O_5 + ZrO_2 + Nb_2O_5)$ | 0.60 | 0.54 | 0.54 | 0.54 | 0.54 |
| $WO_3$ | 5.67 | 4.77 | 4.80 | 5.67 | 4.80 |
| $SiO_2$ | 6.19 | 5.41 | 4.67 | 5.41 | 4.66 |
| $SiO_2/(SiO_2 + B_2O_3)$ | 0.27 | 0.24 | 0.21 | 0.24 | 0.21 |
| $Gd_2O_3$ | 0.00 | 0.00 | 0.00 | 0.00 | 0.00 |
| Total | 100.00 | 100.00 | 100.00 | 100.00 | 100.00 |
| Refractive index ($n_d$) | 1.8086 | 1.8096 | 1.8094 | 1.8103 | 1.8092 |
| Abbe's number ($v_d$) | 40.3 | 40.5 | 40.4 | 40.4 | 40.5 |
| Glass transition temperature Tg (° C.) | 522 | 521 | 521 | 521 | 524 |
| Sag temperature (° C.) | 572 | 570 | 567 | 569 | 571 |
| λ80 (nm) | 403 | 401 | 398 | 400 | 396 |
| Specific gravity | 4.62 | 4.65 | 4.65 | 4.65 | 4.64 |

(Note)
Contents of components and total contents of components represent mass%, and ratios of contents to total contents represent mass ratios.

TABLE 7

|  | 31 | 32 | 33 | 34 | 35 | 36 | 37 |
|---|---|---|---|---|---|---|---|
| B2O3 | 19.70 | 20.13 | 20.31 | 20.02 | 19.71 | 20.44 | 20.13 |
| Li2O | 1.43 | 1.27 | 1.34 | 1.74 | 1.47 | 1.85 | 1.80 |
| ZnO | 20.72 | 21.01 | 20.47 | 20.27 | 20.56 | 20.98 | 21.00 |
| Li2O + ZnO | 22.15 | 22.28 | 21.81 | 22.01 | 22.03 | 22.83 | 22.80 |
| La2O3 | 33.46 | 33.24 | 32.94 | 33.77 | 33.13 | 33.06 | 33.13 |
| Ta2O5 | 10.56 | 10.55 | 10.60 | 10.61 | 10.88 | 10.72 | 10.67 |
| ZrO2 | 2.87 | 2.86 | 3.35 | 3.43 | 3.19 | 3.46 | 3.44 |
| Nb2O5 | 2.75 | 2.75 | 2.76 | 3.02 | 2.75 | 3.05 | 3.04 |
| Ta2O5/(Ta2O5 + ZrO2 + Nb2O5) | 0.65 | 0.65 | 0.63 | 0.62 | 0.65 | 0.62 | 0.62 |
| WO3 | 5.09 | 5.09 | 5.11 | 4.10 | 4.81 | 4.14 | 4.12 |
| SiO2 | 3.42 | 3.10 | 3.12 | 3.04 | 3.50 | 2.30 | 2.67 |

TABLE 7-continued

|  | 31 | 32 | 33 | 34 | 35 | 36 | 37 |
|---|---|---|---|---|---|---|---|
| SiO2/(SiO2 + B2O3) | 0.15 | 0.13 | 0.13 | 0.13 | 0.15 | 0.10 | 0.12 |
| Gd2O3 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |
| Refractive index nd | 1.80935 | 1.80921 | 1.80903 | 1.80951 | 1.80984 | 1.80896 | 1.80941 |
| Abbe's number νd | 40.86 | 40.91 | 40.88 | 40.99 | 40.94 | 41.02 | 40.98 |
| Glass transition temperature Tg (° C.) | 544 | 547 | 542 | 536 | 545 | 530 | 534 |
| Sag temperature Ts (° C.) | 591 | 589 | 585 | 580 | 592 | 573 | 574 |
| Specific gravity | 4.663 | 4.659 | 4.648 | 4.633 | 4.65 | 4.629 | 4.634 |

(Note)
Contents of components and total contents of components represent mass%, and ratios of contents to total contents represent mass ratios Preforms were shaped from refined and homogenized molten glasses corresponding to the glass compositions shown in Tables 1 to 37 as follows. A molten glass was caused to stably flow at a constant rate out of a pipe made of platinum alloy of which the temperature was adjusted to a temperature range in which the molten glass was flowable without devitrification, a molten glass gob was separated from the glass flow by a dropping method or a falling separation method, received with a receiving mold having a gas ejection port in a bottom thereof and shaped into a precision press-molding preform while causing the glass gob to float by ejecting a gas from the gas ejection port. By adjusting and controlling the intervals of separating molten glass gobs, spherical preforms and flattened-sphere-shaped preforms.

The thus-obtained preforms were precision press-molded with a press apparatus shown in FIG. 1 to give aspherical lenses. Specifically, a preform 4 was placed on a lower mold member 2 of a press mold constituted of the lower mold member 2 and an upper mold member 1, an atmosphere in a quartz tube 11 was replaced with a nitrogen atmosphere and then a heater (not shown) was electrically powered to heat the inside of the quartz tube 11. The temperature inside the press mold was set at a temperature at which the glass exhibited a viscosity of $10^8$ to $10^{10}$ dPa·s, and while this temperature was maintained, the upper mold member 1 was pressed downward by moving a pressing rod 13 downward to press the preform set in the press mold. The pressing was carried out at a pressure of 8 MPa for a press time period of 30 seconds. After the pressing, the pressure of the press mold was removed, and while the a glass molded product was in contact with the lower mold member 2 and the upper mold member 1 of the press mold, the glass molded product was gradually cooled to a temperature at which the glass had a viscosity of $10^{12}$ dPa·s, and then it was rapidly cooled to room temperature and taken out of the press mold to obtain an aspherical lens having a concave meniscus form.

In FIG. 1, numeral 3 indicates a sleeve member, 9 indicates a support rod, 10 indicates a support bed and 14 indicates a thermocouple.

Preforms obtained from molten glasses having the glass compositions of Examples 1 to 37 in the same manner as in the manner described above were precision press-molded by the following method different from the above method. In this method, first, while a preform was caused to float, it was pre-heated to a temperature at which the glass constituting the preform had a viscosity of $10^8$ dPa·s. Separately, a press mold having an upper mold member, a lower mold member and a sleeve member was heated to a temperature at which the above glass would exhibit a viscosity of $10^9$ to $10^{12}$ dPa·s, the above pre-heated preform was introduced into the cavity of the press mold and precision press-molded at 10 MPa. Simultaneously with the start of the pressing, the cooling of the glass and the press mold was started, and the cooling was continued until the molded glass had a viscosity of at least $10^{12}$ dPa·s, and the molded product was taken out of the press mold to give an aspherical lens. Aspherical lenses obtained in the above manner had remarkably high surface accuracy.

An anti-reflection film was formed on each of the aspherical lenses of the two types obtained by the precision press-molding.

In the above manner, high-precision optical elements formed of high-refractivity glasses having excellent internal quality could be obtained with high productivity.

These optical elements are suitable for a digital still camera, a digital video camera, a camera mounted on a cellphone and the like.

INDUSTRIAL UTILITY

According to the present invention, there can be obtained an optical glass having a high refractive index, having excellent glass stability, having a low glass transition temperature and having a low-temperature softening property suitable for precision press-molding, and precision press-molding preforms can be produced from the above optical glass. Further, optical elements such as various lenses, etc., can be produced from such preforms.

The invention claimed is:

1. An optical glass comprising, by mass %, 13 to 30% of $B_2O_3$, 0.1 to 4% of $Li_2O$, 17 to 35% of ZnO, 15 to 45% of $La_2O_3$, 4 to 15% of $Ta_2O_5$ exclusive of 15%, 0 to 10% of $ZrO_2$, 0 to 10% of $Nb_2O_5$ provided that $Ta_2O_5/(Ta_2O_5+ZrO_2+Nb_2O_5) \geqq 0.57$, 0 to 20% of $WO_3$, 0 to 1% of $Sb_2O_3$, 0 to 1% of $GeO_2$ and 0 to 1% of $Gd_2O_3$ and having a refractive index $(n_d)$ of 1.80 to 1.84 and an Abbe's number $(v_d)$ of 40.0 to 45.0.

2. The optical glass of claim 1, which has an $Li_2O$ and ZnO total content of 20 to 35 mass %.

3. The optical glass of claim 1, which further contains, by mass %, 0 to 10% of $SiO_2$, 0 to 10% of $Y_2O_3$ and 0 to 10% of $Yb_2O_3$.

4. The optical glass of claim 3, which has a $B_2O_3$, $Li_2O$, ZnO, $La_2O_3$, $Ta_2O_5$, $ZrO_2$, $Nb_2O_5$, $WO_3$, $SiO_2$, $Gd_2O_3$, $Y_2O_3$, $Yb_2O_3$ and $Sb_2O_3$ total content of 99 mass % or more.

5. A precision press-molding preform formed of the glass of claim 1.

6. A process for production of a precision press-molding preform, which comprises causing a molten glass to flow out, separating a molten glass gob and shaping the glass gob into a preform formed of the optical glass of claim 1 during a cooling process of said molten glass gob.

7. An optical element formed of the optical glass recited in claim 1.

8. A process for production of an optical element, which comprises heating the precision press-molding preform of claim 5 and precision press-molding the precision press-molding preform with a press mold.

9. The process for production of an optical element as recited in claim 8, wherein the precision press-molding preform is introduced into a press mold, and the precision press-molding preform and the press mold are heated together to carry out the precision press-molding.

10. The process for production of an optical element as recited in claim 8, which comprises heating the precision press-molding preform and introducing the precision press-molding preform heated into the press mold pre-heated to carry out the precision press-molding.

11. A process for production of an optical element, which comprises heating a precision press-molding preform produced by the process of claim 6 and precision press-molding the precision press-molding preform with a press mold.

12. The optical glass of claim 1, which has a $Ta_2O_5$ content of 10.24 to 15% exclusive of 15%.

* * * * *